(12) United States Patent
Burton et al.

(10) Patent No.: US 10,843,140 B2
(45) Date of Patent: Nov. 24, 2020

(54) WATER AERATION SYSTEM WITH FLOATING DIFFUSER

(71) Applicant: Linne Industries, LLC, Newark, DE (US)

(72) Inventors: Craig Burton, Newark, DE (US); Sandra Burton, Newark, DE (US)

(73) Assignee: Linne Industries, LLC, Newark, DE (US)

( * ) Notice: Subject to any disclaimer, the term of this patent is extended or adjusted under 35 U.S.C. 154(b) by 0 days.

(21) Appl. No.: 16/821,063

(22) Filed: Mar. 17, 2020

(65) Prior Publication Data

US 2020/0215500 A1    Jul. 9, 2020

Related U.S. Application Data

(63) Continuation-in-part of application No. 16/115,727, filed on Aug. 29, 2018, now Pat. No. 10,639,596.
(Continued)

(51) Int. Cl.
| | |
|---|---|
| *B01F 3/04* | (2006.01) |
| *C02F 7/00* | (2006.01) |
| *B01F 15/00* | (2006.01) |
| *B01F 15/02* | (2006.01) |
| *C02F 3/20* | (2006.01) |

(52) U.S. Cl.
CPC ...... *B01F 3/04262* (2013.01); *B01F 3/04248* (2013.01); *B01F 15/00344* (2013.01); *B01F 15/0243* (2013.01); *C02F 3/201* (2013.01); *C02F 7/00* (2013.01); *B01F 2003/0417* (2013.01); *B01F 2003/0439* (2013.01); *B01F 2003/04163* (2013.01); *B01F 2003/04319* (2013.01); *C02F 2201/009* (2013.01)

(58) Field of Classification Search
CPC .............. B01F 3/04262; B01F 3/04248; B01F 15/00344
See application file for complete search history.

(56) References Cited

U.S. PATENT DOCUMENTS

| | | |
|---|---|---|
| 4,279,537 A | 7/1981 | Tweedy |
| 4,657,675 A | 4/1987 | Zan |
| | (Continued) | |

FOREIGN PATENT DOCUMENTS

| | | |
|---|---|---|
| DE | 29806696 U1 | 11/1998 |
| JP | S5442845 | 4/1979 |

OTHER PUBLICATIONS

Solar Pond Aeration Systems, "Off Grid Aeration Systems," retrieved from the internet (publication date unknown—admitted prior art).
(Continued)

*Primary Examiner* — Robert A Hopkins
(74) *Attorney, Agent, or Firm* — Rogowski Law LLC

(57) ABSTRACT

A water aeration system powers an air pump held in an encasement with a solar panel mounted directly or indirectly to the encasement or to the mounting pole supporting the encasement above a ground surface. An air conduit directs pumped air to one or more disc diffusers submerged in the body of water to be aerated. The disc diffuser(s) are supported by a floating platform that is suspended from a buoy or float so that the disc diffuser(s) are held at a desired depth below the water surface.

15 Claims, 12 Drawing Sheets

Related U.S. Application Data which is a continuation-in-part of application No. 15/123,141, filed as application No. PCT/US2015/019096 on Mar. 6, 2015, now abandoned, which is a continuation-in-part of application No. 14/228,864, filed on Mar. 28, 2014, now Pat. No. 9,290,398.

(56) References Cited

U.S. PATENT DOCUMENTS

| | | | |
|---|---|---|---|
| 4,906,359 | A | 3/1990 | Cox, Jr. |
| 6,398,194 | B1 | 6/2002 | Tsai |
| 6,428,694 | B1 | 8/2002 | Brown |
| 6,676,837 | B2 | 1/2004 | Keeton, Jr. |
| 6,805,798 | B2 | 10/2004 | Kerfoot |
| 7,517,460 | B2 | 4/2009 | Tormaschy et al. |
| 7,651,792 | B2 | 1/2010 | Tormaschy et al. |
| 7,670,044 | B2 | 3/2010 | Tormaschy et al. |
| 7,789,553 | B2 | 9/2010 | Tormaschy et al. |
| 7,798,784 | B2 | 9/2010 | Tormaschy et al. |
| 7,850,443 | B2 | 12/2010 | Eigler |
| 7,906,017 | B2 | 3/2011 | Tormaschy et al. |
| 8,057,091 | B2 | 11/2011 | Tormaschy et al. |
| 8,226,292 | B1 | 7/2012 | Walter et al. |
| 8,500,321 | B2 | 8/2013 | Simnioniw et al. |
| 8,529,764 | B2 | 9/2013 | Keeton |
| 8,678,358 | B1 * | 3/2014 | Alenzi .............. B01F 3/04248 210/242.2 |
| 9,290,398 | B2 | 3/2016 | Burton et al. |
| 2004/0261955 | A1 | 12/2004 | Shingleton |
| 2010/0039061 | A1 | 2/2010 | Rosenbaum |
| 2013/0292858 | A1 | 11/2013 | Keeton, Jr. |

OTHER PUBLICATIONS

Post and Pier Foundations—An Easy to Build Post and Pier Foundation, published Jan. 2008 accessed at <https://web.archive.org/web/20080115063724/https://www.countryplans.com/foundation/> (Year: 2008).

"Hollow Pipe vs Solid Rod" Physics Forums <https://www.physicsforums.com/threads/hollow-pipe-vs-solid-rod.37701/> published Aug. 2004 (Year: 2004).

* cited by examiner

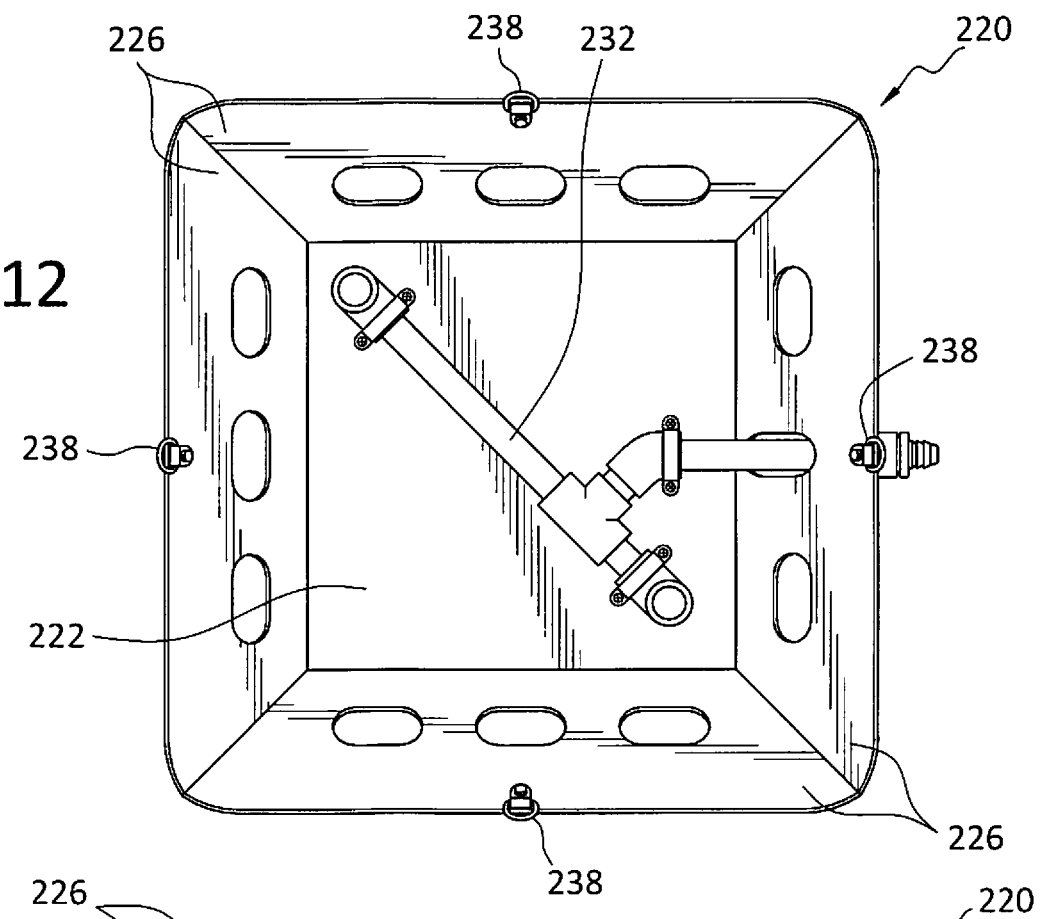
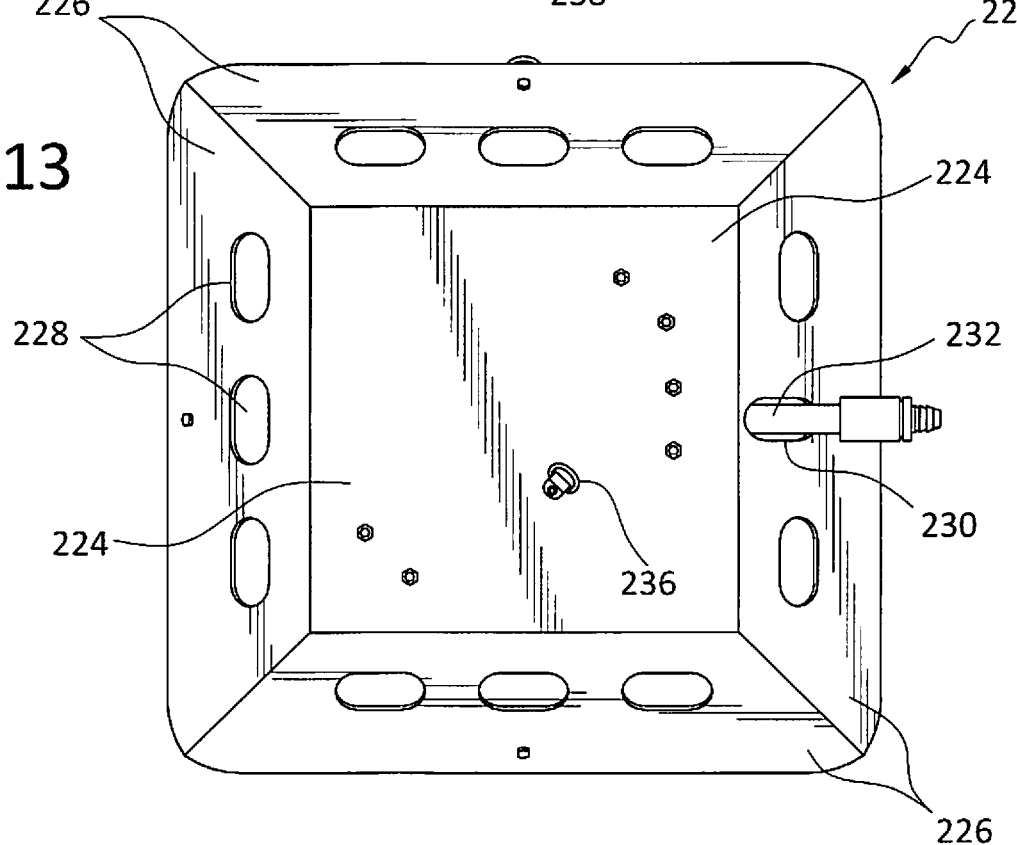

WATER AERATION SYSTEM WITH FLOATING DIFFUSER

CROSS REFERENCE TO RELATED APPLICATION

This application is a continuation in part of U.S. application Ser. No. 16/115,727, filed Aug. 28, 2018, pending, the contents of which is incorporated by reference herein.

BACKGROUND

The field of the present invention relates to solar powered water aeration systems, particularly with tamper resistant, extended life operation, that incorporate a floating platform to retain one or more diffusers at desired water depth for subsurface aeration.

To sustain marine life in lakes, lagoons, ponds and other bodies of water, a sufficient quantity of oxygen in the water is essential. An increase in organic matter production by algae and plants creates greater demand on dissolved oxygen in the water as the organic matter decomposes. The deeper waters in a pond or other body of water may be depleted of oxygen and thus destroy fish habitat. Serious oxygen deficiencies are more likely to occur where there is a combination of high temperature and little wind, along with decaying organic materials. In summer months, storms with high winds may cause a pond to turn over and mix oxygen-deficient water from the bottom of the pond with the surface water, thus further depleting the oxygen supply. During winter, ice and snow covering the water body may also cause oxygen levels to lower.

Oxygen can be restored to a body of water by injecting dissolved oxygen at predetermined depths (subsurface aeration) or by pumping water at the surface as a fountain (surface aeration). Energy efficient means for restoring oxygen continue to be sought.

Various techniques for introducing oxygen to ponds by subsurface aeration with benefit of solar powered equipment have been disclosed in the prior art. As one example, in U.S. Pat. No. 4,906,359 a solar activated water aeration station provides a floating base on which a pump and pump motor and a solar panel for energizing the motor are mounted. An air tube with openings at its distal end extends from the pump and floating base into the water to release air bubbles into the water. A submerged anchor holds the floating base in a desired location of the body of water to be aerated. All of the equipment (the pump, pump motor and solar panel), as well as the floating base, are visible above the body of water and detract from aesthetics.

As another example, in U.S. Pat. No. 6,676,837 a solar aeration system immerses a diffuser into a pond. A pump installed in a control box on a ground surface outside of the pond is powered via a solar panel that is mounted to a post held in the ground surface.

Yet another example is shown in U.S. Pat. No. 4,657,675 in which a solar aeration system has a top container mounted by a pole over a lower container that is submerged into a body of water to be aerated. The top container houses an air pump and supports a solar cell. The lower container houses a filter. Air is pumped into the lower container and creates bubbles that float out of the lower container into the body of water to be aerated. The entirety of the top container is visible above the body of water and detracts from aesthetics.

Such prior solar activated subsurface aeration systems suffer certain drawbacks. Floating systems are difficult to install and difficult to access for maintenance. Ground mounted systems are subject to damage from tampering, and air tubes or conduits can be harmed by lawn maintenance equipment. Many prior systems include batteries or energy accumulators in association with the solar panels. Such batteries or energy accumulators have limited service life and often need repair. Some prior systems include fans to cool pump motors that not only deplete energy from the battery or energy accumulator, but can be clogged by debris or suffer failure due to wear of moving parts, such as bearings and blades. Improvements to solar activated water aeration systems to overcome these drawbacks continue to be sought.

SUMMARY

In one aspect of the invention, a water aeration system has at least one mounting pole defining an inner channel substantially along its length. The bottom end of the mounting pole is adapted for insertion into a ground or a footing for establishing the mounting pole upright with its top end above the ground or footing surface. Preferably the mounting pole has a length of about eight feet (about 2.4 m) or more, with a portion of the length of the pole integrated into a sufficient foundation to bear the wind loads found in the installation zone.

An encasement is mounted at or near the top end of the at least one mounting pole. The encasement defines an internal space in which an air pump and a solar power controller are housed. The encasement has at least one air permeable wall, preferably at least two air permeable walls. The air permeable wall(s) may be a perforated sheet, a screen, a mesh or a wire mesh.

A conduit is supplied to receive air pumped into the conduit by the air pump. The conduit is connected at one end to the air pump and at its opposite end to at least one diffuser. At least a portion of its length of the conduit is positioned within the channel of the at least one mounting pole. Another portion of the length of the conduit is immersed in the water in which the diffuser is immersed. Some portion of the conduit may be buried from the point it exits the mounting pole and enters the water. Preferably, no portion of the length of the conduit is above ground or out of water except for the portion(s) positioned within the channel of the at least one mounting pole or inside the encasement.

A solar panel is directly or indirectly joined to the encasement or the mounting pole such that the solar panel is at or near the top end of the mounting pole. The solar panel generates power that may be converted to current for driving the air pump. A controller associated with the solar panel converts photovoltaic electrical power from the solar panel to current for driving the air pump. Preferably, the controller is encased in the same internal volume of the encasement structure with the air pump.

The subsurface aeration diffuser or diffusers is/are submerged into a body of water to be aerated, such as, but not limited to, ponds or lagoons. These bodies of water include storm water retention ponds, waste water settlement ponds, golf water hazard ponds, irrigation ponds, farm waste ponds, parks and recreation ponds, mine remediation ponds, dead end canals, sewage lagoons, and fish hatcheries.

Preferably, the water aeration system is operated without a battery or other energy accumulator.

In a second aspect of the invention, a pole-mounted enclosure for a solar-powered water aeration system has at least one mounting pole defining an inner channel substantially along its length and having a top end and a bottom end, with the bottom end adapted for insertion into a ground or a footing for establishing the mounting pole upright with its top end above the ground or footing surface. An encasement structure is mounted at or near the top end of the mounting pole. The encasement defines an internal space adapted for holding an air pump or source of compressed air, and has at least one air permeable wall. One or more brackets are joined either to the encasement or at or near the top of the mounting pole that are adapted to join a solar panel to the pole-mounted enclosure.

A conduit for pumped air is adapted for connection to the air pump or source of compressed air at a first end and adapted for connection at its opposite end to at least one diffuser. Preferably, the conduit has a portion of its length positioned within the channel of the mounting pole and a portion of its length immersible in water in which the diffuser may be immersed.

One or more brackets are provided for mounting at least one solar panel to the encasement or the mounting pole at or near the top end of the mounting pole.

In one advantageous embodiment of the invention, the encasement defines at least one trough in a side edge, and one of the sidewalls slidably engages with the trough. Preferably, at least one sidewall of the encasement is air permeable. In this embodiment, the slidably engageable sidewall defines holes therethrough, making the sidewall air permeable.

In still another aspect of the invention, the solar panel defines a sun-facing surface and an opposite surface, and one or more protective screens is positioned over at least a portion of the opposite surface (e.g. underside) of the solar panel to protect the solar panel from tampering and/or damage. In one embodiment with protective screens, a first frame and a second frame are appended or attached to a top surface or a side surface of the enclosure and configured to connect to the opposite surface of the solar panel. Then, each of the one or more protective screens comprises a bent flange configured to contact one of the first frame or the second frame. In addition, preferably, each of the one or more protective screens defines a plurality of holes extending therethrough for improved convection cooling of the opposite surface of the solar panel.

Another embodiment of the invention is a water aeration system with a floating platform to support one or more diffusers submerged a desired depth below the water surface. The water aeration system may have a mounting pole having a top end and a bottom end, with the bottom end adapted for insertion into a ground or a footing spaced apart from and outside of a body of water to be aerated for establishing the mounting pole upright with its top end above the ground or footing surface. An encasement is mounted at or near the top end of the mounting pole. An air pump is held within the encasement. A conduit for air pumped into the conduit by the air pump is connected at one end to the air pump and at its opposite end is adapted to connect directly or indirectly to at least one diffuser. A solar panel is directly or indirectly joined to the encasement or to the mounting pole such that the solar panel is at or near the top end of the mounting pole. The solar panel generates power that may be converted to current for driving the air pump.

A floating diffuser platform system is positioned in the body of water to be aerated with the water aeration system. The floating diffuser platform system has a platform, a buoy or float, one or more lines joining the buoy or float to the platform, and one or more diffusers secured directly or indirectly to the platform. An anchor is linked or joined to the floating diffuser platform by one or more anchor lines. The anchor holds the floating diffuser platform in a desired location of the pond or other body of water to be aerated. The buoy or float supports the platform in a floating, but submerged configuration to keep the diffuser(s) at a desired depth below the water line of the pond or body of water to be aerated. An example of a desired depth is between 5 and 15 feet below the water surface, more preferably from about 8 to about 9 feet. The buoy or float has a floating profile that does not detract from the aesthetics of the pond, with the remaining floating diffuser platform system components submerged in the pond and remaining out of sight.

Piping that is configured to join the second end of the air conduit to the one or more diffusers is held on or near the top surface of the platform. In an advantageous embodiment, the platform has one or more upstanding sidewalls extending away from the top surface and surrounding the piping. Each of the sidewalls may define one or more holes therethrough. Such holes permit greater water circulation to the diffuser(s) supported on the platform. The piping configured to join the second end of the air conduit to the one or more diffusers may extend through one of said one or more holes.

A more complete understanding of the invention, including an understanding of the various configurations of water aeration systems and floating platforms for water aeration systems, will be afforded to those skilled in the art, as well as a realization of additional advantages and objects thereof, by consideration of the followed detailed description. Reference will be made to the appended drawing sheets which will first be described briefly.

BRIEF DESCRIPTION OF THE DRAWINGS

The drawings described herein are for illustrative purposes only and are not intended to limit the scope of the present disclosure. In the drawings, wherein like reference numerals refer to similar components:

FIG. 12 is a top plan view of the platform and piping connections for the dual diffusers of the floating diffuser system of FIG. 10;

FIG. 13 is a bottom plan view of the platform and piping connections for the dual diffusers of the floating diffuser system of FIG. 10;

DETAILED DESCRIPTION

Figure 1:
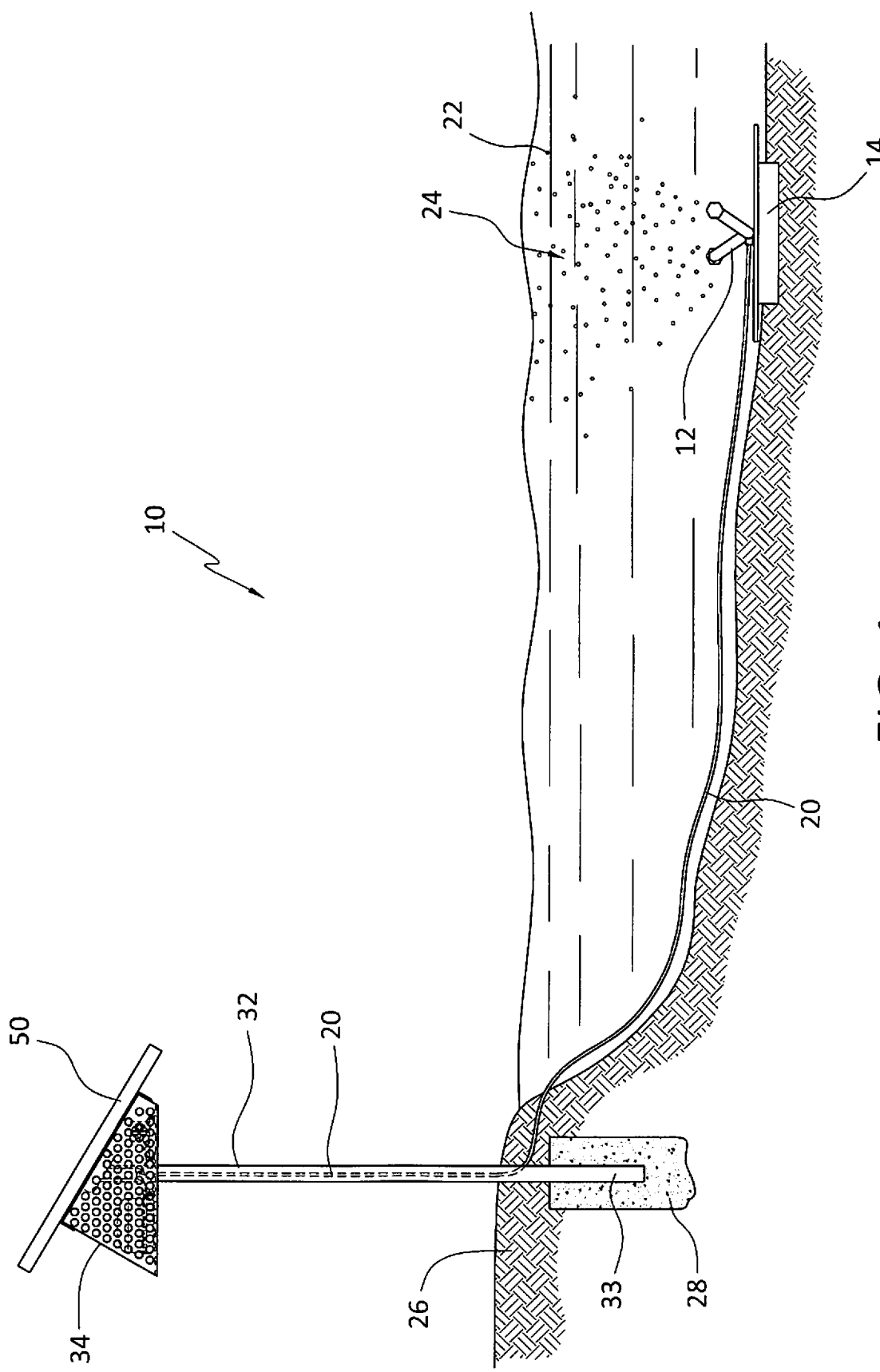
FIG. 1 is a schematic view of a first embodiment of a solar powered water aeration system according to the invention.
Figure 2:
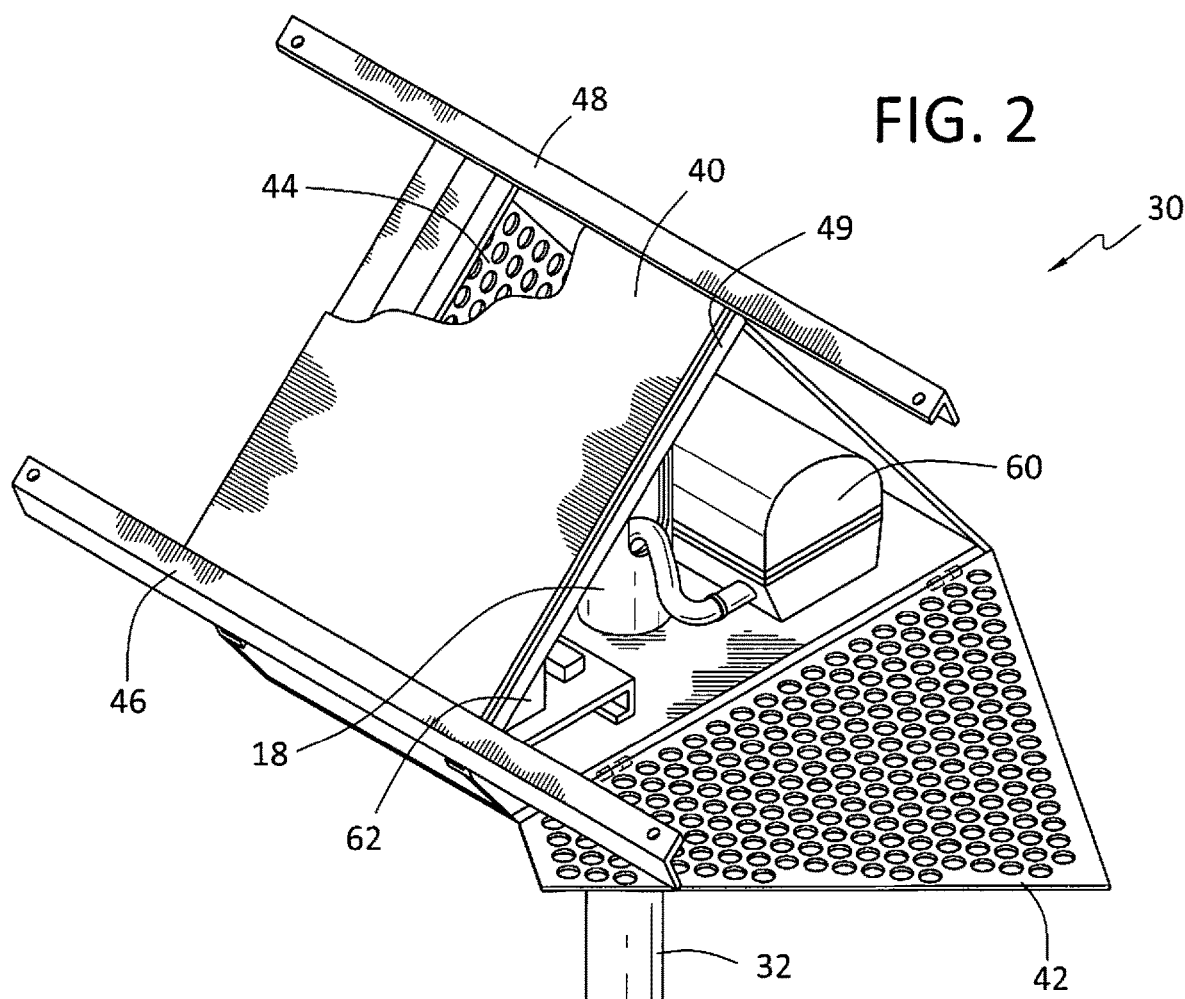
FIG. 2 is a right front perspective view of a mounting pole and encasement for the pump and controller of the water aeration system of FIG. 1, showing a side panel in an open configuration for access to the encasement interior.
Figure 3:
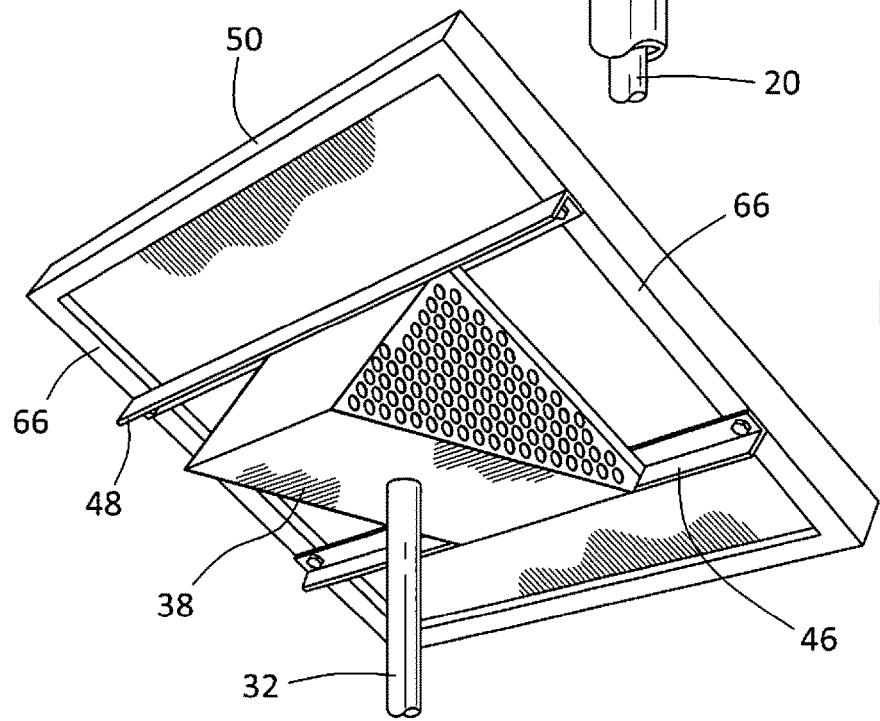
FIG. 3 is a left rear perspective view of the mounting pole and encasement for the pump and controller, also including a solar panel mounted to the encasement, of the water aeration system of FIG. 1.
Figure 4:
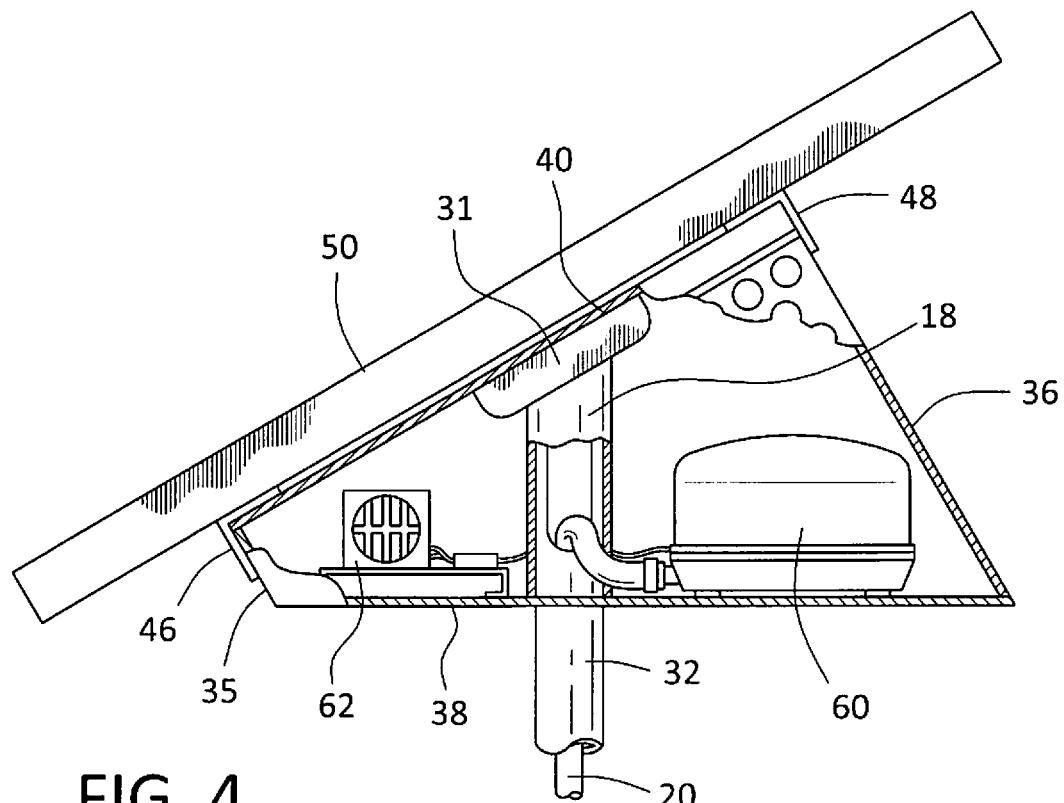
FIG. 4 is a partial cross-sectional view of the encasement showing the encasement interior.
Figure 5:
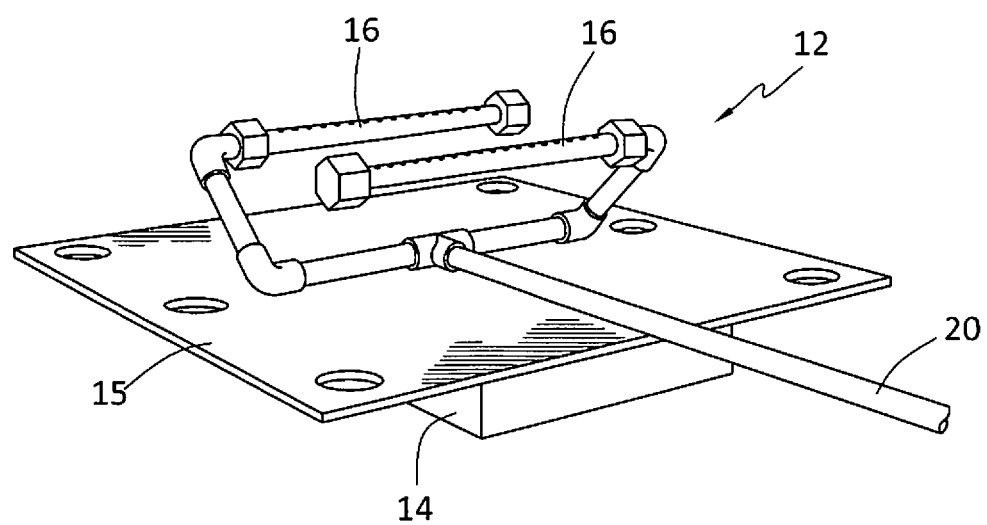
FIG. 5 is a right front perspective view of the diffuser and diffuser platform of the solar powered aeration system of FIG. 1.

Turning in detail to the drawings, FIGS. 1-5 show an embodiment of a water aeration system 10 and its components. Referring first to FIGS. 1 and 5, the water aeration system 10 includes an immersed fine pore tube diffuser 12 that is mounted to a mounting 15 on a diffuser platform or tray 14. The diffuser 12 and diffuser platform or tray 14 are immersed in a body of water, such as a pond 24 to be aerated.

Referring now to FIG. 5, in this embodiment, the diffuser 14 includes one or more diffuser tubes or arms 16 that are perforated or pierced to form holes that permit fluids, such as air or other gases, to flow out of the diffuser tubes or arms 16 into the body of water. As the air escapes from or flows out of the diffuser tubes or arms 16, air bubbles 22 form in the water and serve to transfer oxygen to the water to aerate the pond 24.

Various diffusers or bubblers are known in the market. One exemplary diffuser, as shown in FIGS. 1 and 5, is a JETFLEX tube diffuser available from Jäger Umwelt Technik GmbH Co. KG. Diffusers are available in the shape of discs, plates, tubes or hoses constructed from glass-bonded silica, porous ceramic, PVC or perforated membranes or conduits made from EPDM (ethylene propylene diene monomer) rubber and/or a slit silicone sheet. Air pumped through the diffuser membranes is released into the water. The bubbles released from the diffuser may be fine bubbles, with diameters smaller than 3 mm, or larger bubbles with diameters greater than 3 mm. As a general rule, smaller bubbles and a deeper release point will generate a greater oxygen transfer rate into the water. Other tube diffusers or disk diffusers may be secured to diffuser platform or tray 14 as desired. The invention is not limited to any one specific diffuser or bubbler.

Platform or tray 14 preferably is formed of a corrosion-resistant material, such as but not limited to stainless steel.

The diffuser 12 emits pumped air that is transmitted through an air conduit 20 from a pump 60 to the diffuser 12. The pump 60 is mounted in an encasement structure 34 as described further herein.

Referring to FIGS. 1-4, the solar power assembly 30 includes an encasement structure 34 that is secured to a top 31 of a mounting pole 32. A receiver cylinder 18 is integrated into the encasement structure 34. The receiver cylinder 18 receives the top 31 of the pole 32 to secure the top 31 to the encasement structure 34. The receiver cylinder 18 has an open top end. The receiver cylinder 18 has an internal diameter slightly larger than the external diameter of the top 31 of the pole 32. When the two are joined, the top 31 of the pole 32 goes into the receiver cylinder 18 and then is locked into place, such as with a set screw. This has the advantage of installing the pole such that it is vertical. When the encasement is placed, it can be rotated so that the solar panel faces south when it is installed in the northern hemisphere, and north when it is installed south of the equator.

In the embodiment shown, the mounting pole 32 has a bottom 33 that is held in the ground 26, and preferably is held in association with a footer 28 installed in the ground 26. The mounting pole 32 preferably has a length in the range of about 8 feet to about 10 feet (2.4 to 3.1 m). A shorter or longer pole length may be used depending on the mounting location and other factors (e.g., shipping costs). The mounting pole 32 preferably comprises a hollow core or channel therein. In one preferred embodiment, the mounting pole comprises an extruded rust-resistant metal tube or pipe, such as but not limited to a steel alloy or stainless steel or aluminum or an aluminum alloy. A schedule 40 or schedule 80 rigid steel pipe is one exemplary mounting pole.

The encasement structure 34 has a front face 35, a rear face 36, a bottom face 38 and a top face 40. The side panels 42, 44 of the encasement structure 34 comprise an air permeable material, such as a perforated sheet, a screen or a mesh. The air permeable material permits sufficient air flow into the interior of the encasement structure 34 so that equipment held inside the encasement structure 34 remains at or near ambient temperature. Examples of suitable air permeable materials include but are not limited to: metal screen, perforated metal, expanded metal sheet, wire mesh, wire screen, coated wire mesh, coated wire screen, composite material mesh, nylon screen, and moldable material mesh or screen. Preferably, one side panel 42 is joined by hinges to the bottom face 38 so that the side panel 42 may be tilted open for access to the interior space of the encasement structure 34.

The encasement structure 34 may be formed with powder coated sheet steel, or of stainless steel, or aluminum, or plastics (e.g., vacuum molded or injection molded or 3D printed).

A pump 60 is held within the interior space of the encasement structure 34. A controller 62 for converting solar energy to DC or AC current to power the pump 60 also is installed within the interior space of the encasement structure 34. Exemplary controllers 62 that may be used in the water aeration system include: a linear current booster (LCB); a pulse width modulated (PWM) controller; and a maximum power point tracking (MPPT) controller. Known suppliers for LCB controllers include Solar Converters and Sunpumps. Known suppliers for MPPT controllers include Morningstar, Outback, Xantrex and Midnite Solar. Preferably, a quick release internal controller mounting system with an integrated terminal strip electrically connects the controller 62 to the pump 60. The quick release can be decoupled for repair or replacement.

One exemplary pump 60 is a DC-powered linear air pump. One suitable low maintenance, oil free, linear air pump is offered by Alita Industries, Inc. and has a rated performance of 60 liters per minute at 15 kPa. Other suitable pumps include diaphragm or piston pumps with DC motors, particularly those rated for marine or RV or other outdoor use. Pumps rated for 80 liter, 120 liter or 150 liter pumping capacity are also suitable.

An air tube or air conduit 20 is joined at one end to the output of the pump 60 and is joined at its opposite end to the diffuser 12. In the embodiment shown in FIGS. 1-4, the air tube or air conduit 20 is threaded through the open top of the receiver cylinder 18 and into the hollow opening of the mounting pole 32 and is held therein. The air tube or air conduit 20 extends substantially along the length of the mounting pole 32, and is then buried under ground 26 to keep the air tube or air conduit 20 secure from tampering or from damage to which it would be subject if it were left exposed along the outside of the mounting pole 32 or on the ground surface 26. Preferably, all or substantially all of the air tube or air conduit 20 that is above the ground surface is secured against tampering and damage by being within the encasement structure 34 or within the mounting pole 32 or other protective structure associated with the encasement structure 34 and mounting pole 32.

Preferably, the air tube or air conduit 20 is a thick-walled flexible tube that does not float. One exemplary air tube 20 is a Kuri Tec Nautilus air tube from Kuriyama of America, Inc.

A first mounting 46 is joined to the front face 35 of the encasement structure 34. A second mounting 48 is joined to the rear face 36 or the top face 40 of the encasement structure 34. The mountings 46, 48 may comprise brackets that connect to frame beams or sections 66 that hold the edges of a solar panel 50, and rail mountings 49 that engage rear structure of the solar panel. The combination of mountings 46, 48, 49 and beams 66 are used to secure the solar panel 50 to the encasement structure 34 so that the solar panel 50 is mounted above the encasement structure 34. The top 40 of the encasement structure may be in contact with the rear face of the solar panel 50 for added stability in the mounting. In most circumstances, however, a gap is left between the top 40 of the encasement structure and the rear face of the solar panel 50 to permit air flow and convective cooling of the solar panel 50.

The solar panel 50 is directly or indirectly electrically connected to the controller 62. Solar energy collected by the solar panel 50 is converted to DC current that may be used to power motor 60. If desired, an inverter to convert DC current to AC current to power motor 60. Any of the available solar panel technologies can be used with the water aeration system according to the invention, whether monocrystalline, multicrystalline, thin film or any other type.

The receiver cylinder 18 allows for quick and secure installation of panels and components to the mounting pole 32 and air tube 20 with minimal installation tools. The receiver cylinder 18 secures the solar panel 50 and encasement structure 34 combination to the mounting pole. The encasement structure 34 may be rotated on the mounting pole 32 to customize orientation of the system at the mounting site. Once oriented, the encasement structure 34 may be secured to the top of the mounting pole 32 via the receiver cylinder 18 with dual lock bolts (not shown).

We have found that a battery or an energy accumulator is not needed. The pump 60 is powered during those times when there is sufficient daylight for the solar panel 50 to collect solar energy. While the pump is not powered at other times, we have found that daytime only operation of the water aeration system is sufficient to aerate a body of water. In the summer months, when aeration is most important, daylight hours are longer and the water aeration system pumps air to the diffuser for a longer duration. In the winter months, when aeration is still desirable, the water aeration system pumps air to the diffuser for a shorter duration because there are fewer daylight hours. However, we have found such durations to be sufficient during each of these seasons. The output of the solar array has a daily solar rhythm or circadian rhythm that matches the need and capacity for aeration of the pond or other water body for each season during the calendar year.

We have found that a fan to cool the pump is not needed. The air permeable side panels 42, 44 permit sufficient air flow into the encasement structure 34 to maintain ambient temperatures therein. The pump 60, such as a linear air pump, is cooled solely by this air flow through the encasement structure. The natural convective movement of air past the pump is a passive cooling strategy that obviates the need for a motor driven method of moving air (such as a fan).

We have found that mounting the solar panel 50, controller 62 and pump 60 at a sufficient height above the ground prevents damage from tampering. In addition, threading the air conduit or tube 20 from the pump to the diffuser through a hollow channel in the mounting pole 32 protects the air conduit or tube from tampering and from damage that can occur during lawn maintenance. Because the air conduit or tube is not on the ground surface, it is not exposed to possible cutting or other damage from lawn mowers or trimmers, and it is not a tripping hazard to passersby.

Figure 6:
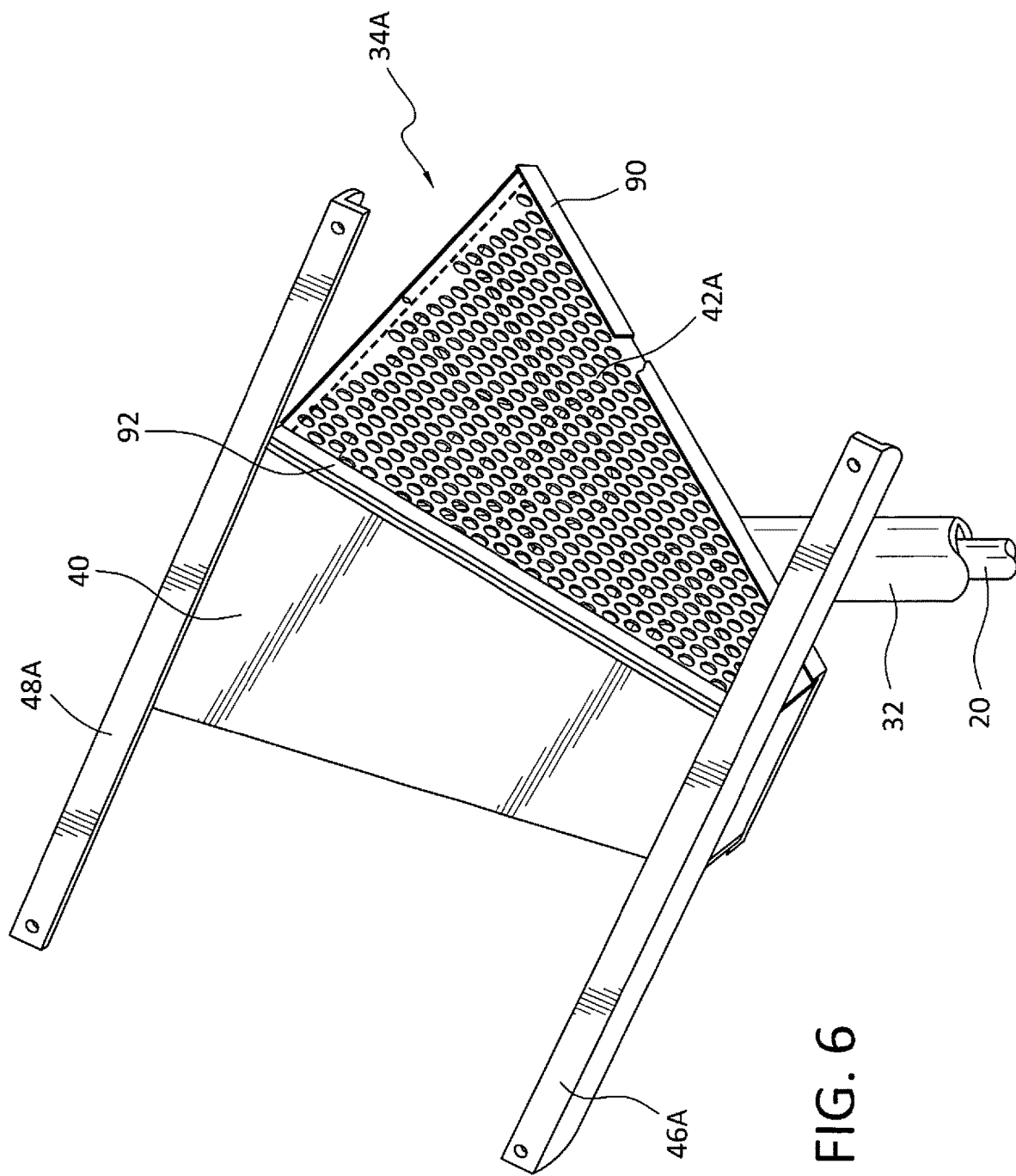
FIG. 6 is a right front perspective view of a mounting pole and encasement for a pump and controller of a second embodiment of the water aeration system according to the invention, without the solar panel mounted thereto.
Figure 7:
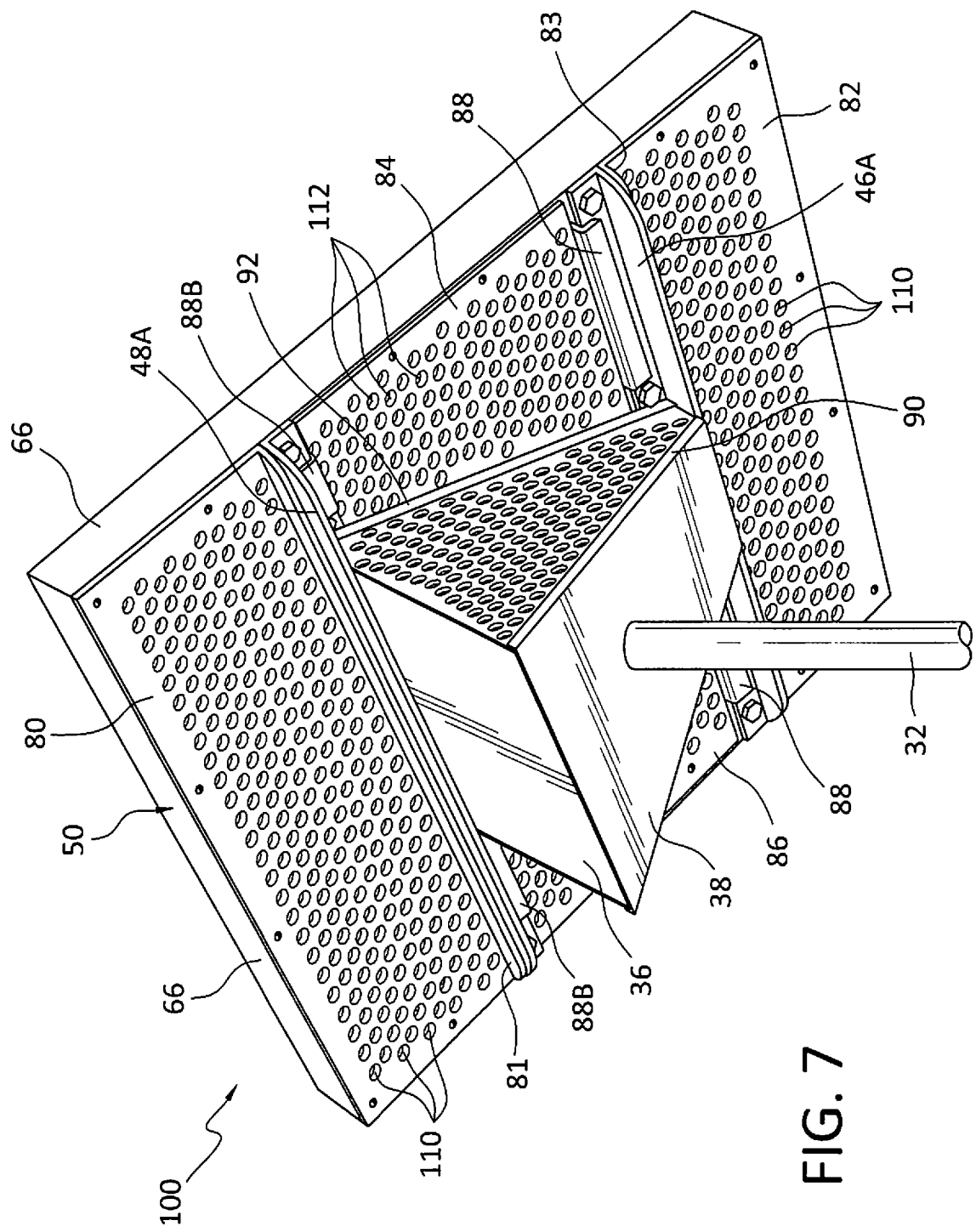
FIG. 7 is a left bottom perspective view of the mounting pole and encasement for the pump and controller of the second embodiment of the water aeration system of FIG. 6, showing the solar panel mounted thereto with protective screens.
Figure 8:
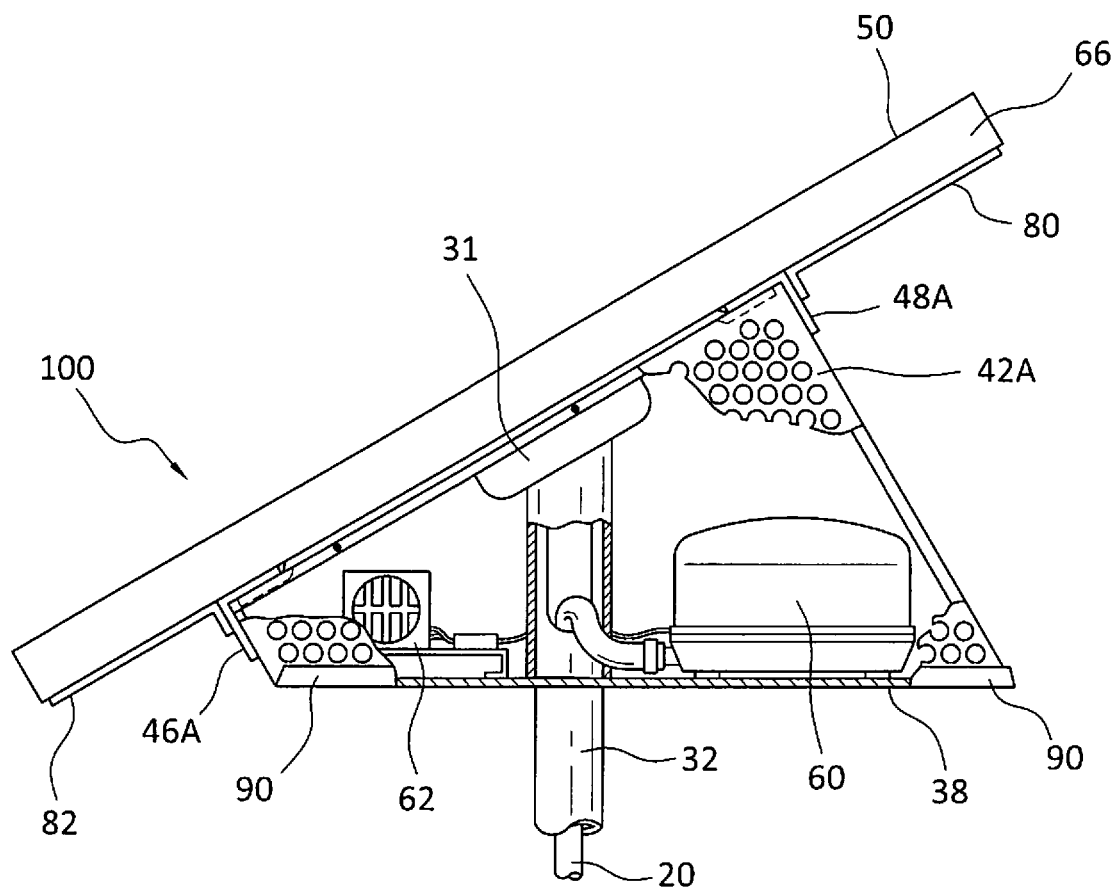
FIG. 8 is a left side elevational view in partial cross section showing the water aeration system of FIG. 6 with the solar panel and protective screens of FIG. 7.

Referring next to FIGS. 6-8, an alternative embodiment of an enclosure for a water aeration system 100 has an encasement structure 34A to house the air pump 60 and the solar controller 62. The encasement structure 34A has at least one trough 90 and at least one sidewall or side panel 42A that slidably engages with the at least one trough 90. The at least one sidewall or side panel 42A may then be secured to flanges of the adjacent walls of the encasement with removable fasteners, such as screws.

A first mounting 46A is joined to the front face 35 of the encasement structure 34A. A second mounting 48A is joined to the rear face 36 or the top face 40 of the encasement structure 34A. The mountings 46A, 48A may comprise brackets that connect to frame beams or sections 66 that hold the edges of a solar panel 50, and rail mountings 49 that engage rear structure of the solar panel. The combination of mountings 46A, 48A, 49 and beams 66 are used to secure the solar panel 50 to the encasement structure 34A so that the solar panel 50 is mounted above the encasement structure 34A. The top 40 of the encasement structure may be in contact with the rear face of the solar panel 50 for added stability in the mounting. In most circumstances, however, a gap is left between the top 40 of the encasement structure 34A and the rear face of the solar panel 50 to permit air flow and convective cooling of the solar panel 50.

The solar panel 50 has a face surface on which the photovoltaic cells are held and an opposite surface. In the embodiment shown in FIGS. 7 and 8, the opposite surface of the solar panel 50 is protected from tampering and from damage by protective screens 80, 82, 84 and 86. Protective screens 80, 82 in the embodiment shown in FIG. 7 are generally rectangular and have an upstanding flange 81, 83 along one lengthwise side edge. The upstanding flanges 80, 82 abut upstanding wall portions of the mountings 46A, 48A respectively, and may be joined thereto. The protective screens 80, 82 are secured to the underside of the beams 66 holding the solar panel 50 with fasteners, such as screws. Preferably the protective screens 80, 82 define a plurality of holes 110 therethrough to permit air flow to the opposite surface or back side of the solar panel 50 for convective cooling of the solar panel 50.

Protective screens 84, 86 in the embodiment shown in FIG. 7 are generally trapezoidal shaped, and have bent flanges 88, 88B extending from the top and bottom edges of the trapezoid. The bent flanges 88, 88B are configured to seat over base portions of the mountings 46A and 48A joined to the encasement 34A. The protective screens 84, 86 are secured to the underside of the beams 66 holding the solar panel 50 with fasteners, such as screws. Preferably the protective screens 84, 86 define a plurality of holes 112 therethrough to permit air flow to the opposite surface or back side of the solar panel 50 for convective cooling of the solar panel 50.

The protective screens 80, 82, 84, 86 prevent damage to the solar panel 50 by creating a barrier to projectiles (e.g., stones, golf balls). Such projectiles contact the screens rather than the underside or opposite surface of the solar panel.

Protective screens 80, 82, 84, 86 may be formed of powder coated sheet steel, or of stainless steel, or aluminum, or plastics (e.g., vacuum molded or injection molded or 3D printed).

Figure 9:
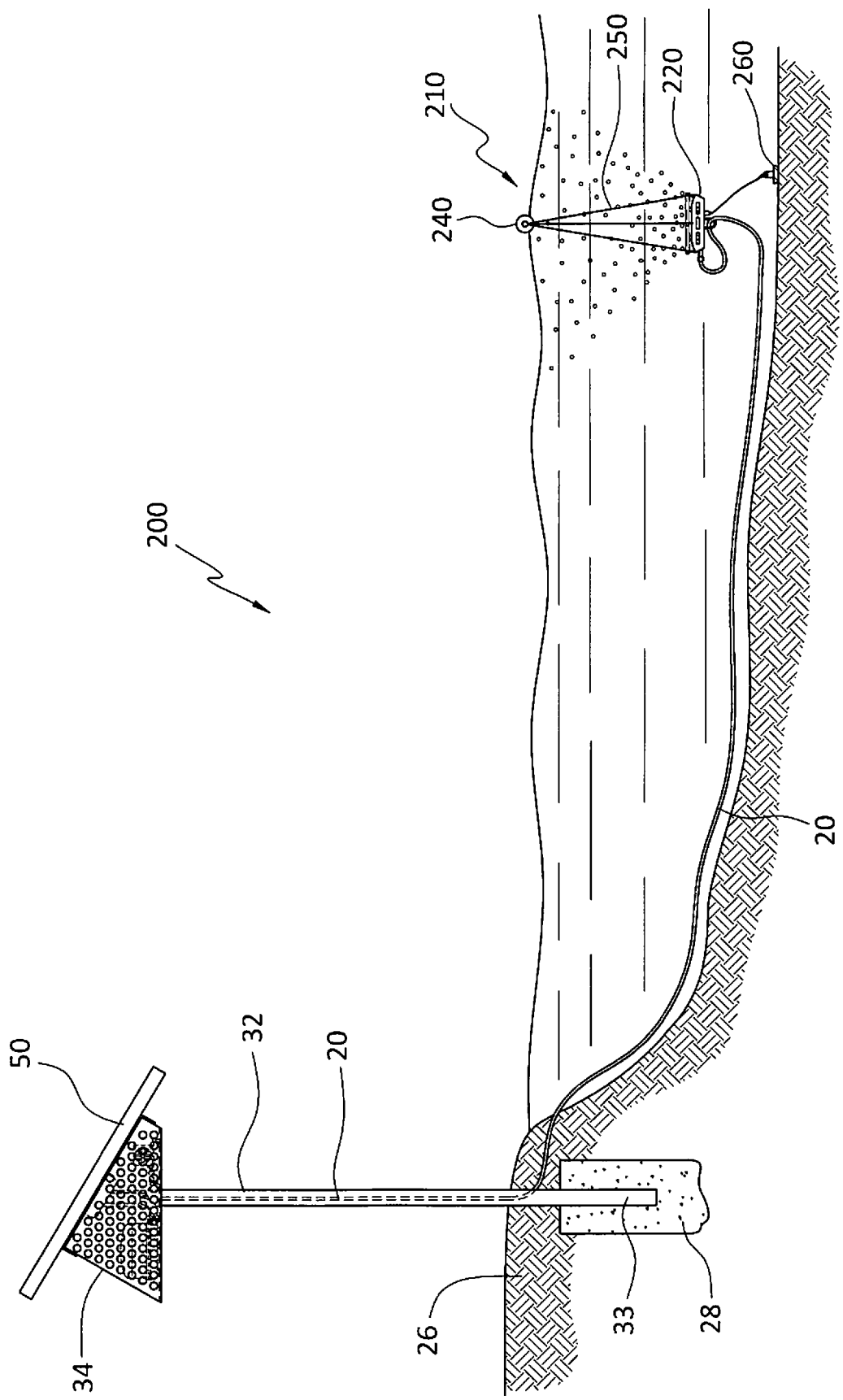
FIG. 9 is a schematic view of a third embodiment of a solar powered water aeration system according to the invention.

Referring next to FIGS. 9-15, an alternative solar powered water aeration system 200 is shown. The water aeration system 200 includes an encasement structure 34 (or optionally encasement structure 34A) supporting a solar panel 50 and housing an air pump that is powered by the solar panel 50. The encasement structure 34, 34A is mounted by a hollow or substantially hollow mounting pole 32 that is seated at one pole end 33 in a footer 28 in the ground 26. A conduit 20 extends from the pump to one or more diffusers submerged in the body of water to be aerated. The conduit 20 as shown in FIG. 9 preferably is secured from tampering because it is held inside the pole 32, and is buried below ground level and then extends into the body of water to be aerated.

Different from the first embodiment shown in FIG. 1, the water aeration system 200 of FIG. 9 includes a floating diffuser system 210. To improve water aeration performance for deeper bodies of water, such as ponds having pond depths greater than ten (10) feet, it can be helpful to maintain the diffuser(s) at a desired depth below the water surface that is less than the full pond depth. Exemplary depths are in the range of from 5 feet to 12 feet below the water surface. A floating diffuser system 210 according to the invention provides a submerged platform 220 that supports one or more diffusers 270 at a desired depth position below the water surface.

Figure 10:
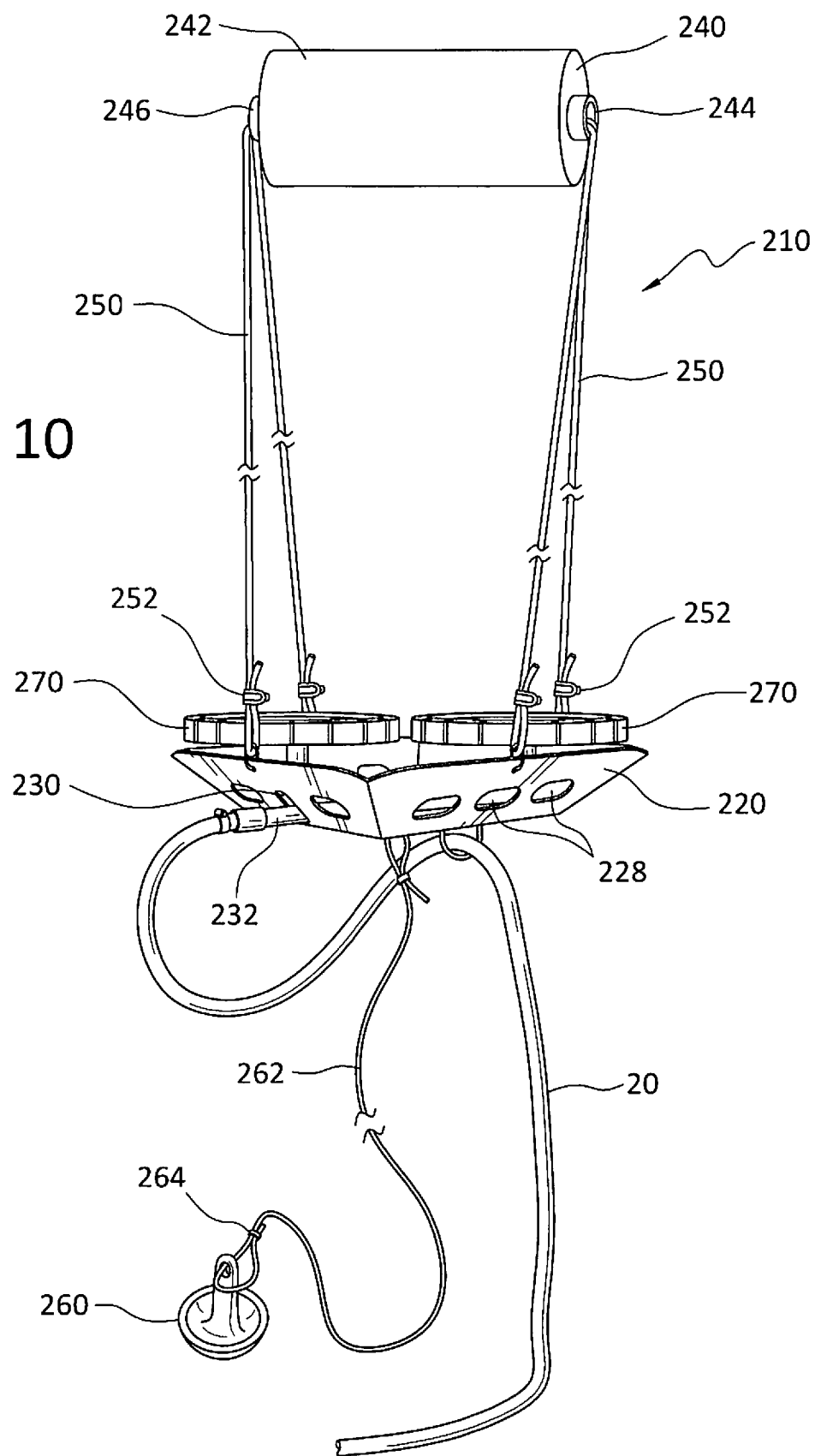
FIG. 10 is a right front perspective view of a floating diffuser system of the solar powered water aeration system of FIG. 9.
Figure 11:
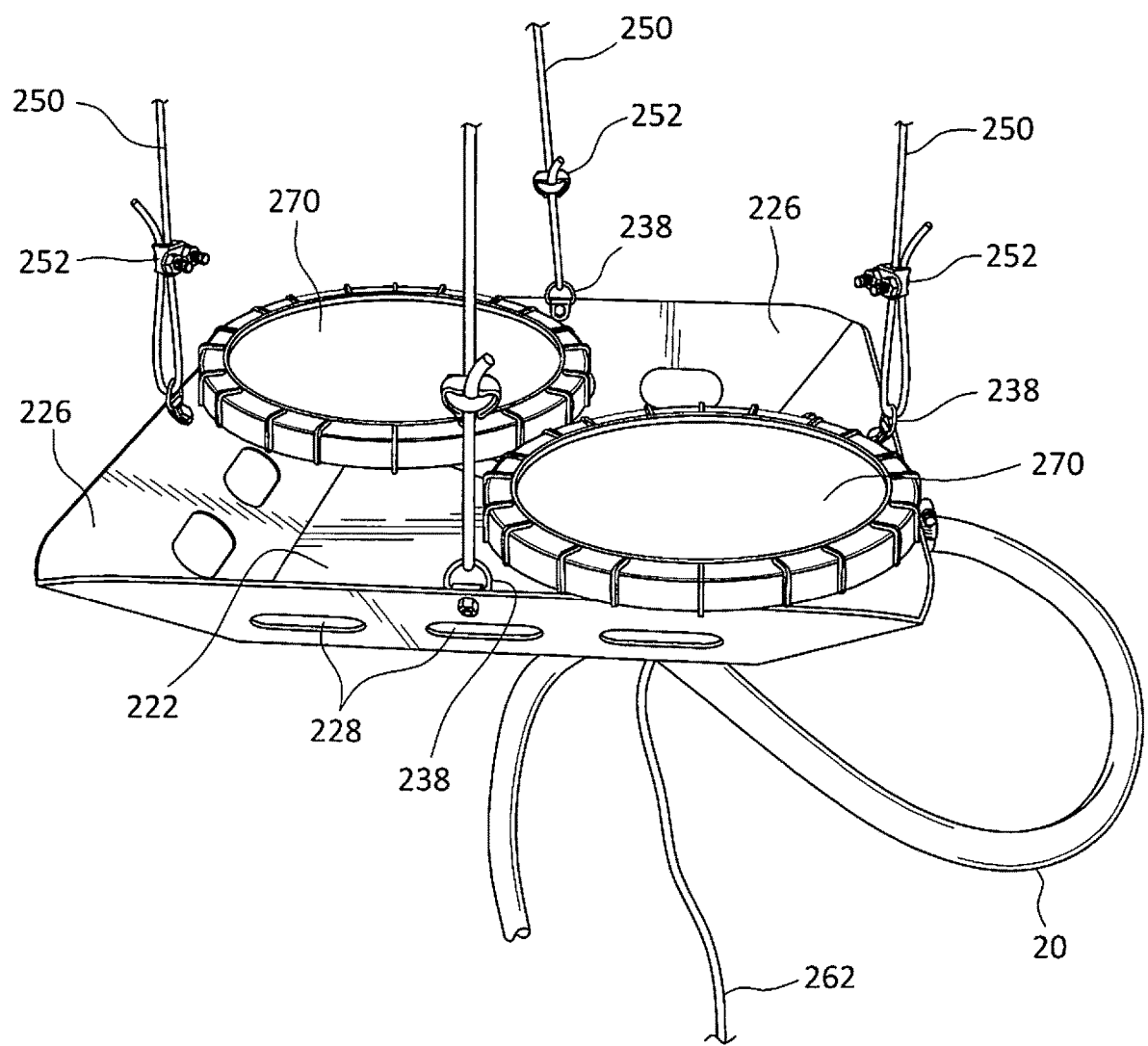
FIG. 11 is a magnified front perspective view of the platform and dual diffusers of the floating diffuser system of FIG. 10.
Figure 14:
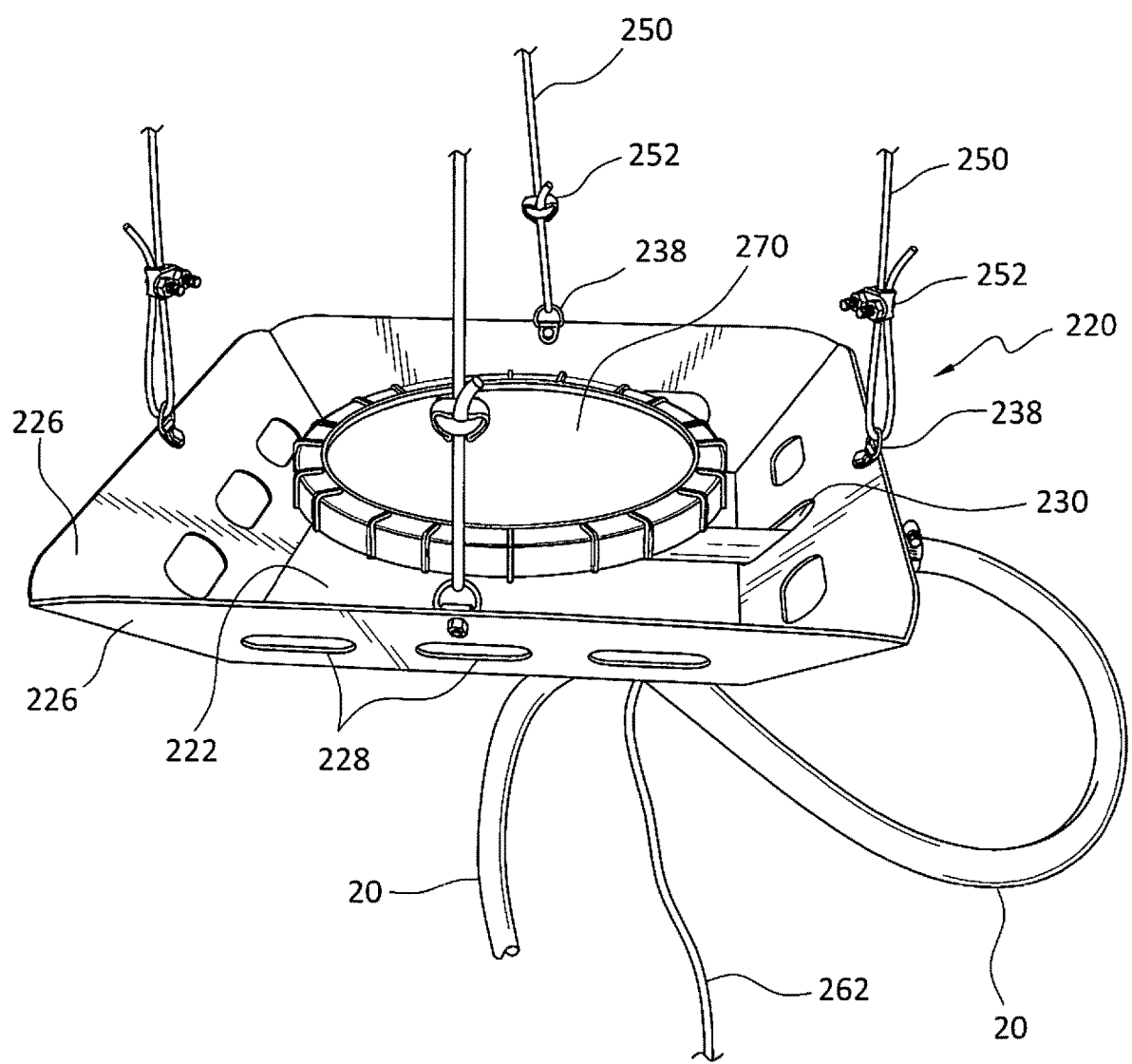
FIG. 14 is a magnified front perspective view of an alternative platform and single diffuser suitable for a floating diffuser system of the solar powered water aeration system of FIG. 9.
Figure 15:
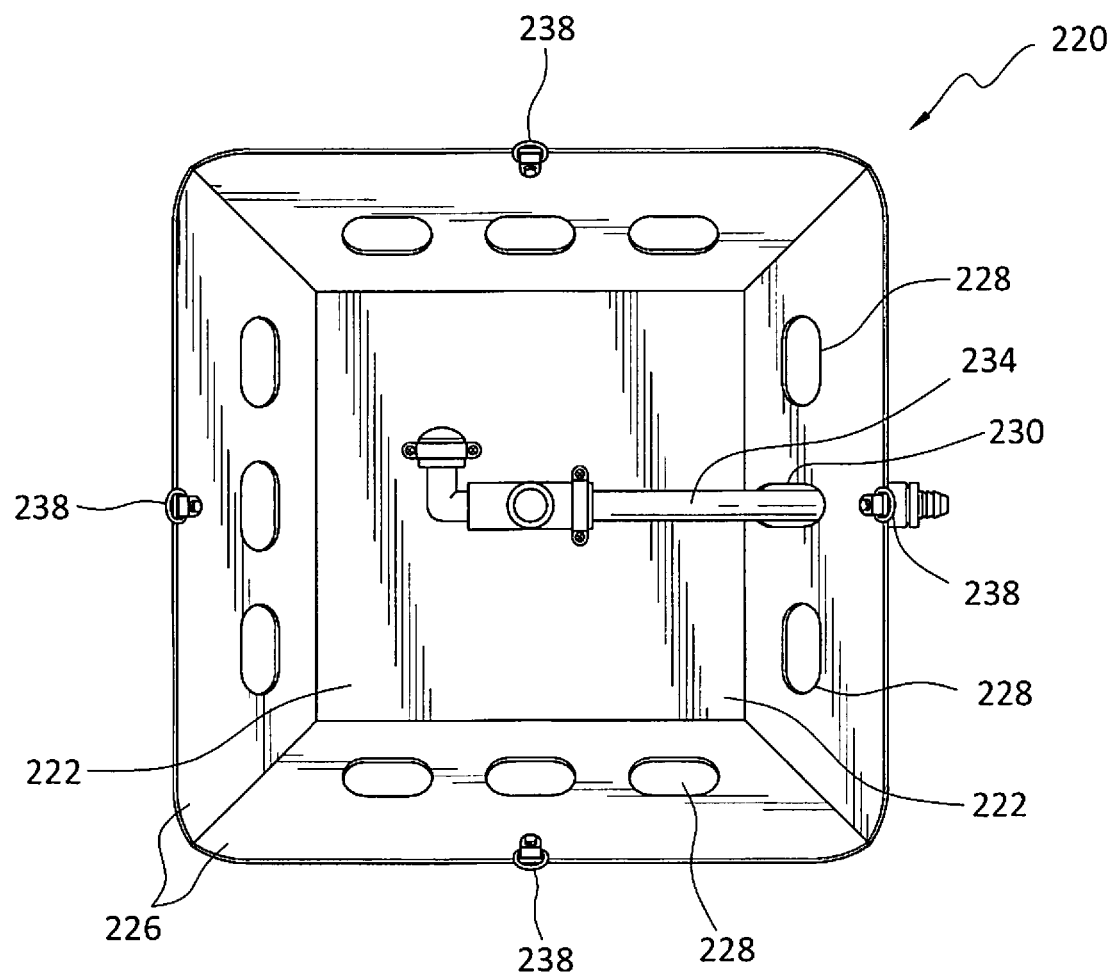
FIG. 15 is a top plan view of the platform and piping connections for the single diffuser of the floating diffuser system of FIG. 15.

Referring to FIGS. 9 and 10, the floating diffuser system 210 has a platform 220 having a top surface 222 and a bottom surface 224 opposite from the top surface 222. Upstanding sidewalls 226 surround the top surface 222. The upstanding sidewalls 226 may be angled outwardly away from the top surface 222 at an angle in the range of from 30 degrees to 80 degrees, preferably 45 degrees to 60 degrees. The upstanding sidewalls 226 define one or more elongate holes 228 therethrough. The elongate holes 228 permit greater water circulation to the diffuser(s) supported on the platform. The air bubbles emitted from the diffuser(s) 270 float to the surface and create a current flow that pulls water at the diffuser depth up to the pond surface. This water circulation is important to aerating the water in the pond in which the floating diffuser system 210 has been installed.

One or more of the upstanding sidewalls 226 also may define one or more other holes 230 therethrough to receive conduit or piping 232 to connect the conduit hose 20 from the air pump 60 to the disc diffuser(s) 270.

In the embodiment of FIGS. 10-13, the platform 220 supports two diffusers 270 and conduit pipe 232 is provided with a common header and two tube openings, each such tube opening to operatively connect to an individual disc diffuser 270. In the embodiment shown in FIGS. 14-15, the platform 220 supports one diffuser 270 and conduit pipe 234 is provided with header connected to one tube opening to operatively connect to one individual disc diffuser 270.

A portion of the airline conduit hose 20 may be supported by the platform 220 by looping the airline conduit hose 20 through a strap 236 extending from the bottom surface 224 of the platform 220.

A buoy or float 240 has an elongate body 242 with flanges 244, 246 formed at each end. The buoy may be made of polystyrene or polyurethane or other marine-grade material with sufficient buoyancy to remain floating at a surface of a body of water and to support the platform 220 and disc diffusers 270 at a desired depth in the body of water.

Connection lines 250 are joined at one end to the buoy 240 and at the opposite end to the sidewalls 226 of the platform 220. In the embodiment shown in FIG. 10, the connection lines 250 are looped into receiving loops or rings 238 attached to the sidewalls 250, and then clamped with rope clamps 252.

A boat bumper can be used as the buoy or float 240. Boat bumpers generally have an eyelet at each end to which the connection lines 250 may be attached.

An anchor 260 is joined to the bottom surface 224 of the platform 220 by a rope or line 262 that is tied or clamped to the anchor 260 and tied or clamped to a connection ring or loop extending from the bottom surface 224 of the platform 220. In the embodiment shown in FIG. 10, rope clamps 264 are used to secure the ends of the line 262.

The anchor line 262 should have slack, e.g., a sufficient length to adjust for anticipated fluctuations in water depth. For example, if the connection lines 250 from the buoy 240 to the platform are of a length of nine (9) feet, and if the pond depth is nominally twelve (12) feet deep, the anchor line 262 should have a length calculated as the pond depth, minus nine (9) feet, plus two (2) feet slack to adjust for water level fluctuations: 12'−9'=3'+2'=5'. In this example, the length of the anchor line 262 should be five (5) feet long.

The disc diffusers may be fine bubble membrane disc diffusers that generally are available in 7-inch, 9-inch and 12-inch diameter. Depending upon the disc size, the air flow rates are generally from 0.5 to 10 scfm when submerged in water from a depth of 5 feet to 15 feet.

While not wishing to be bound by one theory, we have found that determining a preferred depth of the diffuser(s) in the body of water depends in part on the pumping capacity for the air pump. For example, when using an air pump with an 80 liter or 120 liter pump capacity, a desired depth for the diffuser(s) is about 8 or 9 feet below the water surface. When using an air pump with an 150 liter pump capacity, a desired depth for the diffuser is about 10 to about 12 feet.

The floating diffuser system 210 according to the invention keeps the disc diffusers 270 at optimum submerged depth to aerate a body of water. From the water surface, only the buoy or float 240 is visible, with the platform 220 and the disc diffusers 270 remaining submerged. Due to the modest size profile of the buoy or float 240, the floating diffuser system 210 does not detract from pond aesthetics.

The platform 220 onto which the disc diffusers 270 is mounted may be introduced to the water of the pond with the top surface 222 and the disc diffusers 270 facing downwardly toward the bottom or floor of the pond. As the platform 220 sinks into the water, and with the disc diffusers 270 activated, due to what is called a "reverse parachute" effect, before the platform 220 reaches the pond bottom, the platform 220 will flip over (invert) so that the top surface 222 and the disc diffusers 270 face the top surface of the pond to be aerated.

Thus, various configurations of solar powered water aeration systems are disclosed. While embodiments of this invention have been shown and described, it will be apparent to those skilled in the art that many more modifications are possible without departing from the inventive concepts herein. The invention, therefore, is not to be restricted except in the spirit of the following claims.

GLOSSARY 10 water aeration system
12 diffuser
14 diffuser platform
15 mounting plate for diffuser
16 diffuser arm
18 receiver cylinder
20 conduit from pump to diffuser
22 air bubbles
24 pond
26 ground
28 footer
30 solar power assembly
31 top of mounting pole
32 hollow mounting pole
33 bottom of mounting pole
34 encasement
34A encasement
35 front face of encasement
36 rear face of encasement
38 bottom of encasement
40 top of encasement
42 side panel of encasement
44 side panel of encasement
46 frame mounting for solar panel
46A frame mounting for solar panel
48 frame mounting for solar panel
48A frame mounting for solar panel
49 rail mounting for solar panel
50 solar panel
60 air pump
62 solar controller
66 beams holding solar panel
80 protective screen
81 flange
82 protective screen
83 flange
84 protective screen
86 protective screen
88 bent flange
90 trough
92 optional trough
100 water aeration system
110 holes
112 holes
200 water aeration system with floating diffuser platform
210 floating diffuser platform
220 platform
222 top surface of platform
224 bottom surface of platform
226 sidewall
228 elongate holes
230 hole
232 conduit for two disc diffusers
234 conduit for one disc diffuser
236 strap
238 ring or hook
240 buoy or float
242 elongate body of buoy or float
244 flange at end of buoy or float
246 flange at end of buoy or float
250 connection lines
252 rope clamps
260 anchor
262 line to anchor
264 rope clamps
270 disc diffuser/bubbler/aerator

What is claimed is:

1. A floating platform for a water aeration system, comprising:
   a buoy or float;
   one or more lines joining the buoy or float to the platform, the platform comprising a top surface and a bottom surface opposite the top surface;
   one or more diffusers secured directly or indirectly to the platform; and
   an air conduit having a first end and a second end, said first end of said air conduit operatively connected directly or indirectly to a source of pumped air, and said second end of said air conduit connected directly or indirectly to the one or more diffusers,
   wherein a portion of the air conduit is movably joined to the platform.

2. The floating platform of claim 1, further comprising:
   an anchor linked to the platform by one or more anchor lines.

3. The floating platform of claim 1, wherein piping configured to join the second end of the air conduit to the one or more diffusers is held on or near the top surface of the platform.

4. The floating platform of claim 3, wherein the platform has one or more upstanding sidewalls extending away from the top surface and surrounding the piping.

5. The floating platform of claim 1, wherein the platform has one or more upstanding sidewalls extending away from the top surface, and wherein each of said sidewalls defines one or more holes therethrough.

6. The floating platform of claim 1, wherein the platform has one or more upstanding sidewalls extending away from the top surface, and wherein each of said sidewalls defines one or more holes therethrough, and wherein piping configured to join the second end of the air conduit to the one or more diffusers extends through one of said one or more holes.

7. The floating platform of claim 1, wherein the one or more lines have a length in the range of from 5 feet to 15 feet.

8. A water aeration system comprising:
   a mounting pole having a top end and a bottom end, with the bottom end adapted for insertion into a ground or a footing spaced apart from and outside of a body of water to be aerated for establishing the mounting pole upright with its top end above the ground or footing surface;
   an encasement mounted at or near the top end of the mounting pole, said encasement defining an internal space;
   an air pump held within the encasement;
   a conduit for air pumped into the conduit by the air pump, said air conduit having a length and connected at one end to the air pump and at its opposite end adapted to connect directly or indirectly to at least one diffuser,
   a solar panel defining a sun-facing surface and an opposite surface, the solar panel directly or indirectly joined to the encasement or the mounting pole such that the solar panel is at or near the top end of the mounting pole, wherein said solar panel generates power that may be converted to current for driving the air pump; and a floating diffuser platform system comprising: a platform, a buoy or float, one or more lines joining the buoy or float to the platform, the platform comprising a top surface and a bottom surface opposite the top surface, and one or more diffusers secured directly or indirectly to the platform.

9. The water aeration system of claim 8, further comprising:

an anchor linked to the floating diffuser platform by one or more anchor lines.

10. The water aeration system of claim 8, wherein a portion of the air conduit is movably joined to the platform.

11. The water aeration system of claim 8, wherein piping configured to join the second end of the air conduit to the one or more diffusers is held on or near the top surface of the platform.

12. The water aeration system of claim 11, wherein the platform has one or more upstanding sidewalls extending away from the top surface and surrounding the piping.

13. The water aeration system of claim 8, wherein the platform has one or more upstanding sidewalls extending away from the top surface, and wherein each of said sidewalls defines one or more holes therethrough.

14. The water aeration system of claim 8, wherein the platform has one or more upstanding sidewalls extending away from the top surface, and wherein each of said sidewalls defines one or more holes therethrough, and wherein piping configured to join the second end of the air conduit to the one or more diffusers extends through one of said one or more holes.

15. The water aeration system of claim 8, wherein the one or more lines have a length in the range of from 5 feet to 15 feet.

* * * * *